(12) United States Patent
Aaron

(10) Patent No.: US 8,335,504 B2
(45) Date of Patent: Dec. 18, 2012

(54) METHODS, DEVICES AND COMPUTER READABLE MEDIA FOR PROVIDING QUALITY OF SERVICE INDICATORS

(75) Inventor: Jeffrey Aaron, Atlanta, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1035 days.

(21) Appl. No.: 11/843,954

(22) Filed: Aug. 23, 2007

(65) Prior Publication Data

US 2009/0054074 A1 Feb. 26, 2009

(51) Int. Cl.
*H04W 24/00* (2009.01)
*H04M 1/725* (2006.01)
*H04M 1/663* (2006.01)

(52) U.S. Cl. .................... 455/425; 455/412.2

(58) Field of Classification Search .... 455/414.1–414.2, 455/550.1, 423, 421
See application file for complete search history.

(56) References Cited

U.S. PATENT DOCUMENTS

| | | | |
|---|---|---|---|
| 4,853,628 A | 8/1989 | Gouldsberry et al. | |
| 5,505,057 A | 4/1996 | Sato et al. | |
| 5,812,932 A * | 9/1998 | Wiedeman et al. | 455/13.1 |
| 6,130,707 A | 10/2000 | Koller et al. | |
| 6,580,914 B1 | 6/2003 | Smith | |
| 6,587,835 B1 | 7/2003 | Treyz et al. | |
| 6,853,628 B2 | 2/2005 | Chitrapu | |
| 6,892,217 B1 | 5/2005 | Hanmann et al. | |
| 6,912,398 B1 | 6/2005 | Domnity | |
| 6,947,976 B1 | 9/2005 | Devitt et al. | |
| 6,977,997 B2 | 12/2005 | Shioda | |
| 7,046,987 B2 | 5/2006 | Siegel et al. | |
| 7,136,658 B2 | 11/2006 | Cole | |
| 7,136,688 B2 | 11/2006 | Jung et al. | |
| 7,155,238 B2 | 12/2006 | Katz | |
| 7,324,959 B2 | 1/2008 | Malkin et al. | |
| 7,599,795 B1 | 10/2009 | Blumberg et al. | |
| 7,634,228 B2 | 12/2009 | White et al. | |
| 2002/0082931 A1 | 6/2002 | Siegel et al. | |
| 2002/0095333 A1 | 7/2002 | Jokinen et al. | |
| 2002/0101993 A1 | 8/2002 | Eskin | |
| 2002/0147928 A1 | 10/2002 | Mahajan et al. | |
| 2002/0178385 A1 | 11/2002 | Dent et al. | |
| 2003/0006913 A1 | 1/2003 | Joyce | |
| 2003/0008661 A1 | 1/2003 | Joyce | |
| 2003/0050039 A1 | 3/2003 | Baba et al. | |
| 2003/0198204 A1 * | 10/2003 | Taneja et al. | 370/332 |
| 2004/0032503 A1 | 2/2004 | Monden | |
| 2004/0082351 A1 | 4/2004 | Westman | |

(Continued)

OTHER PUBLICATIONS

U.S. Appl. No. 11/610,927, filed Dec. 15, 2006.

(Continued)

*Primary Examiner* — Steven Lim
(74) *Attorney, Agent, or Firm* — Parks IP Law LLC; Jennifer P. Medlin, Esq.

(57) ABSTRACT

Provided are exemplary embodiments including a methods, software and devices for providing Quality of Service ("QoS") information the user of a mobile communications device while present at a geographic position. The embodiments include methods and devices for receiving a communication signal on a wireless communication device while located at the geographic location, measuring a characteristic of the communication signal pertinent to the proper operation of the wireless computing device in addition to signal strength; and providing a cognizable rendition of the quality of the characteristic to the user by the wireless communication device. The cognizable rendition may be a bar indicator or other audio, visual, vibratory, olfactory or tactile indicator.

19 Claims, 5 Drawing Sheets

U.S. PATENT DOCUMENTS

| | | | |
|---|---|---|---|
| 2004/0092269 A1 | 5/2004 | Kivinen | |
| 2004/0110515 A1 | 6/2004 | Blumberg et al. | |
| 2004/0141606 A1 | 7/2004 | Torvinen | |
| 2004/0209602 A1 | 10/2004 | Joyce | |
| 2005/0073406 A1 | 4/2005 | Easley et al. | |
| 2005/0075116 A1 | 4/2005 | Laird et al. | |
| 2005/0113123 A1 | 5/2005 | Torvinen | |
| 2005/0117516 A1* | 6/2005 | Yang | 370/232 |
| 2005/0149443 A1 | 7/2005 | Torvinen | |
| 2005/0153729 A1 | 7/2005 | Logan et al. | |
| 2005/0176420 A1* | 8/2005 | Graves et al. | 455/424 |
| 2005/0215238 A1 | 9/2005 | Macaluso | |
| 2005/0221876 A1 | 10/2005 | Van Bosch et al. | |
| 2005/0248456 A1 | 11/2005 | Britton et al. | |
| 2005/0266870 A1 | 12/2005 | Benco et al. | |
| 2005/0288038 A1 | 12/2005 | Kim | |
| 2006/0009240 A1 | 1/2006 | Katz | |
| 2006/0015404 A1 | 1/2006 | Tran | |
| 2006/0033625 A1 | 2/2006 | Johnson et al. | |
| 2006/0089158 A1 | 4/2006 | Lai et al. | |
| 2006/0095540 A1 | 5/2006 | Anderson et al. | |
| 2006/0194595 A1 | 8/2006 | Myllynen et al. | |
| 2006/0224863 A1 | 10/2006 | Lovett et al. | |
| 2006/0253453 A1 | 11/2006 | Chmaytelli et al. | |
| 2007/0004393 A1 | 1/2007 | Forsberg et al. | |
| 2007/0037561 A1 | 2/2007 | Bowen et al. | |
| 2007/0037605 A1 | 2/2007 | Logan | |
| 2007/0054687 A1 | 3/2007 | Akita et al. | |
| 2007/0136796 A1 | 6/2007 | Sanchez et al. | |
| 2007/0182544 A1 | 8/2007 | Benson et al. | |
| 2007/0182818 A1 | 8/2007 | Buehler | |
| 2007/0232342 A1 | 10/2007 | Larocca | |
| 2007/0287379 A1* | 12/2007 | Matsuura et al. | 455/39 |
| 2008/0004951 A1 | 1/2008 | Huang et al. | |
| 2008/0032677 A1* | 2/2008 | Catovic et al. | 455/414.1 |
| 2008/0045236 A1 | 2/2008 | Nahon et al. | |
| 2008/0114778 A1 | 5/2008 | Siegel | |
| 2008/0146205 A1 | 6/2008 | Aaron | |
| 2008/0169921 A1 | 7/2008 | Peeters | |
| 2008/0182563 A1 | 7/2008 | Wugofski et al. | |
| 2008/0182586 A1 | 7/2008 | Aaron | |
| 2008/0268895 A1 | 10/2008 | Foxenland | |
| 2009/0176524 A1 | 7/2009 | David | |
| 2009/0292920 A1 | 11/2009 | Willey | |

OTHER PUBLICATIONS

U.S. Appl. No. 11/611,475, filed Dec. 15, 2006.
U.S. Appl. No. 11/611,517, filed Dec. 15, 2006.
U.S. Appl. No. 11/668,803, filed Jan. 30, 2007.
U.S. Appl. No. 11/627,260, filed Jan. 25, 2007.
U.S. Appl. No. 11/627,269, filed Jan. 25, 2007.
Helio GPS-powered Buddy Beacon, http://www.helio.com, date unknown, believed to exist before filing of the present application.
GPS Locator Phone, http://www.wherify.com/wherifone/kids/html?page-kids, copyright 2006, believed to exist before filing of the present application.
Dodgeball.com bringing your phone to life. http://www.dodgeball.com, copyright 2006, believed to exist before filing of the present application.
Onstar Technology, http://www.onstar.com/US_english/jsp/explore/onstar_basics/technology.jsp, copyright 2006, believed to exist before filing of the present application.
Palo Wireless "K1-Generic Access Profile", http://www.palowireless.com/infotooth/tutorial/k1_gap.asp (Internet Archive Wayback Maching) 2004.
U.S. Appl. No. 11/611,345, filed Dec. 15, 2006.
U.S. Appl. No. 11/610,890, filed Dec. 15, 2006.
U.S. Appl. No. 11/610,898, filed Dec. 15, 2006.
U.S. Appl. No. 11/611,434, filed Dec. 15, 2006.
Aalto et al. "Bluetooth and WAP Push Based Location-Aware Mobile Advertising System" MobiSys (2004).
Woodings et al. "Rapid Heterogeneous Connection Establishment: Accelerating Bluetooth Inquiry Using IrDA" (2002).
Huang et al. "A self-adaptive zone routing protocol for Bluetooth scatternets", www.sciencedirect.com (2004).
Helio: GPS Cell Phone Enabled With Google Maps & Buddy Beacon, www.helio.com (Dec. 2006).

* cited by examiner

METHODS, DEVICES AND COMPUTER READABLE MEDIA FOR PROVIDING QUALITY OF SERVICE INDICATORS

TECHNICAL FIELD

Embodiments described herein are related to mobile communication devices. The subject matter relates more particularly to methods, devices, and computer readable media to provide a quality of service indicator to a user.

BACKGROUND

Wireless communication devices are popular and ubiquitous devices among the general populace. The cost of wireless communication devices has plummeted and functionality has improved exponentially. As a result, most adults and an increasing number of children routinely carry a cell phone or other wireless communication device on their person as a general purpose appliance. However, the quality of service delivered by a wireless network is far from uniform.

SUMMARY

It should be appreciated that this Summary is provided to introduce a selection of these concepts in a simplified form that are further described below in the Detailed Description. This Summary is not intended to identify key features or essential features of the claimed subject matter, nor is it intended to be used to limit the scope of the claimed subject matter. The following disclosure provides embodiments for measuring and rendering one or more indications to a user of a wireless communication device that describes the quality of the local wireless network signal for a wireless application.

Provided are exemplary embodiments. The embodiments include a method for conveying quality of service information at a geographic location to a user that comprises receiving a communication signal on a wireless communication device while located at the geographic location and measuring a characteristic of the communication signal pertinent to the proper operation of the wireless computing device in addition to signal strength. The characteristic is processed to provide a cognizable rendition of the quality of the characteristic to the user by the wireless communication device.

Exemplary embodiments also include a wireless communication device that comprises a transceiver and a measurement sensor in communication with the transceiver. The measurement sensor measures a characteristic of the communication signal, other than signal strength, that is pertinent to the proper operation of the wireless communication device. The device also includes a processor in communication with the measurement sensor. The processor produces an indicator value describing the characteristic. The device further comprises an indicator specific to the wireless computing application, the indicator renders the indicator value to a user.

In accordance with other exemplary embodiments, a computer readable medium is provided with instructions to perform acts that include receive a communication signal on a mobile communication device, while located at the geographic location, measure a characteristic of the communication signal pertinent to the proper operation of the wireless computing device, the characteristic being other than signal strength and signal-to-noise ratio and provide a cognizable rendition of the characteristic to the user by the mobile communication device via an indicator.

Other apparatus, methods, and/or computer program products according to embodiments will be or become apparent to one with skill in the art upon review of the following drawings and Detailed Description. It is intended that all such additional systems, methods, and/or computer program products be included within this description, be within the scope of the present invention, and be protected by the accompanying claims.

DETAILED DESCRIPTION

Figure 1:
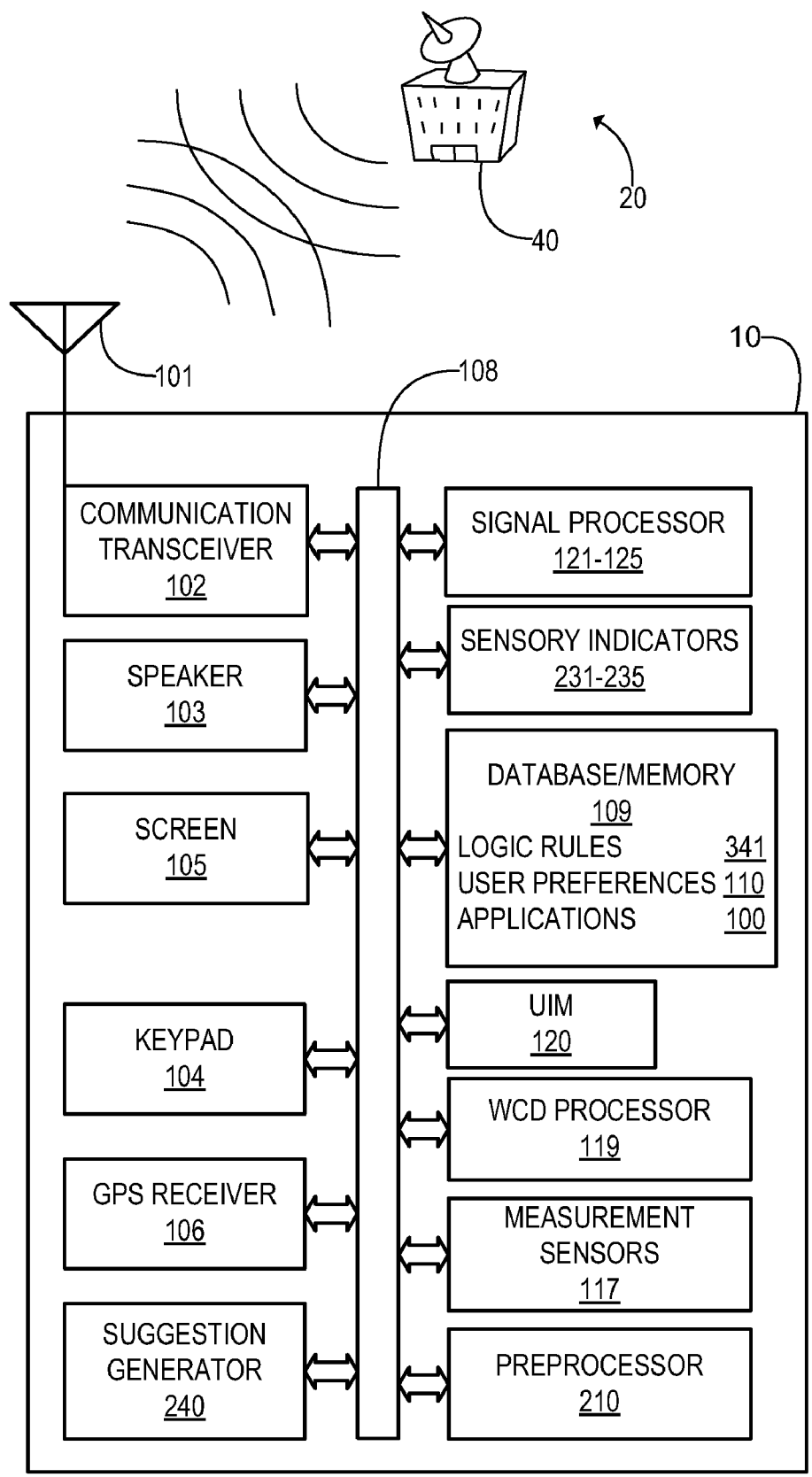
FIG. 1 is an abstract depiction of a wireless communication device within a simplified network.

The following disclosure is directed to apparatus and methods allowing a user of a wireless communication device ("WCD") to easily monitor specific Quality of Service ("QoS") metrics of a wireless signal in regards to specific wireless software applications or categories of wireless software applications as the user moves between geographic positions. A WCD may be any wireless communication device. Non-limiting examples of a WCD may include a cell phone, an I-PHONE® mobile communication device, a PDA, a pager, an MP3 player, a radio, a miniaturized computer and the like.

In the following detailed description, references are made to the accompanying drawings that form a part hereof and which are shown, by way of illustration, using specific embodiments or examples. Referring now to the drawings, in which like numerals represent like elements through the several figures, aspects of the apparatus and methods provided herein will be described.

Throughout the day, users may encounter many different geographic locations under a plethora of environmental conditions. Each user in a specific location may be using a different user application on their WCD or a specific user may be using multiple applications. Traditionally, users have been able to monitor the signal strength (i.e. signal-to-noise ratio) being received by their WCD by referring to a bar indicator display where 0-1 bars may indicate that no signal is available in that location and 4-5 or more bars may indicate that an acceptable or very strong signal is available. Such an indication may experience a time delay as the signal sampling periodicity may be relatively long.

A single signal strength indicator may be completely adequate for a single purpose WCD such as a simple cell phone. However, with the evolving sophistication of WCDs and the multiplicity of features and applications being added to the WCD platform, there may be other signal characteristics that may be more critically related to QoS for specific applications even though the traditional overall signal strength is strong. For example, one person using a voice-over-IP application at one table may experience no degradation in their QoS, while the person at the next table playing a multilevel game application may be experiencing poor performance even though the overall signal strength in that location is strong for both.

As WCDs continue to implement an ever increasing inventory of applications, it may be desirable to configure a WCD to detect and analyze the wireless signal at a given geographic position for a number of signal characteristics. A variety of specific QoS parameters resulting from the analysis may be presented to the user either in a single QoS indicator or in the form of multiple QoS indictors in what may be characterized as a "dashboard" of QoS indictors. The methods and apparatus described herein may allow users to easily and quickly monitor the signal relative to the sensitivities of a particular application(s) in near-real time. The term "real time" is used herein to mean immediately, "in the moment" or without perceptible delay. The term "near-real time" is used herein to mean with some delay, perhaps perceptible to some users, but which is not unacceptable to most users and is usually not considered a significant delay. If so configured, a WCD may be able to automatically sample and analyze the available signal on a periodic or on a continuous basis and drive a number of cognizable sensory indicators be they, visual, audio, vibratory, tactile or a combination thereof. Indicators may also emit smoke or be olfactory in nature.

As a non-limiting example of a signal characteristic, a particular application may be sensitive to jitter. Even if the overall signal strength is strong, a relatively high level of jitter or the wrong type of jitter may degrade the QoS relative to that application. Other applications executing simultaneously may not be affected by the jitter in the wireless signal. Therefore, one application may be adversely affected while others are not. QoS may therefore be perceived by the user to be poor for no apparent reason. By analyzing the signal for jitter, a specific jitter indication may be presented to the user in addition, or alternatively, to the overall signal strength and independently from the overall signal strength.

Jitter may encompass several forms. An analysis and indicator may be created for each form of interest and/or for each form relevant to the perceived quality of a particular application or service. Non-limiting examples of jitter may include data dependent jitter, periodic jitter, random jitter (i.e. Gaussian jitter), instantaneous/pulse jitter and duty-cycle jitter. Jitter is the deviation in or displacement of some aspect of the pulses in a digital signal or packet. Jitter may be thought of as pulse distortion in amplitude, phase timing, pulse timing or in pulse width. Exemplary causes of jitter may be electromagnetic interference, signal cross-talk, electronic component imperfections, and variations in communications network processing as for example in the servicing of data queues within routers. Jitter may be measured in absolute terms or in statistical terms. Other jitter parameters may include the period of time over which the jitter exceeds a certain absolute, relative or derived level Jitter may also refer to the variation in the delay (i.e. latency) of packets across an IP network such as the internet or a voice/video over IP system. Latency is usually described as the amount of time it takes a packet to travel from a source to a destination. Packet latency or delay may result from a number of causes that may include variation in packet routing, changes in internal router queues, router failures, and the like. Acceptable latency or delay magnitude is typically less than 100 milliseconds (ms) delays. A particular application may be more or less sensitive to latency. It is interesting to note that a user may audibly detect round trip voice delays of 150 ms or more. The human ear is able to detect actual latencies in the 200-250 ms range.

Packet loss (i.e. data loss) is the actual loss of a packet of data during transmission due to losses in transmission or by the purposeful discarding of a packet that arrives too late at the receiver. Packet loss is another exemplary characteristic where monitoring may be desired for a specific application. Packet loss may be monitored by analyzing the packet headers or the technique of Deep Packet Inspection may be used to examine the data payload. Such an analysis may be done passively by a WCD 10 itself, or the analysis may be done actively. Active analysis may include participation by a central server 40 in the form of a packet sent inventory and receive inventory comparison. Passive measures may include an inventory of time-stamped packets, time-stamped by a GPS system at the central server 40. It should be noted that the central server 40 discussed herein is not contemplated to be limited to a server within a central office of the communication network per se but may be a central server at an internet service provider or website. The central server 40 may also be implemented as a multitude of servers or as one or more distributed servers.

Signal power may also be monitored and analyzed as an input to produce an indicator. More importantly, characteristics derived from signal power may also be analyzed and used to produce a characteristic indicator. For example, the use of pulse modulation spread spectrum may produce communication pulses such that a conventional signal-to-noise analysis and indicator would either miss the pulse or if the pulse was detected, it would not be processed properly. As such, characteristics derived from signal power or signal-to-noise ratio are also contemplated as indicators or inputs to create indicators.

Other conditions or parameters of concern may include the frequency of communication session re-initiation. Session re-initiation occurs where one of a number of logical calls on any level of the physical communication may drop. A session may be defined as a logical interaction between two or more communication entities. Such session re-initiation may be a parameter of concern in some applications, and in particular may have a significant effect on the perceived quality of some applications, whereas other applications may be more tolerant of such re-initiations.

As a non-limiting example, sophisticated, multi-level interactive games may utilize a number of control sessions occurring simultaneously (i.e. multiplexed) over a single physical communication pathway. Such sessions may be bi-directional or unidirectional and may require that several different video, audio and data communications sessions run simultaneously between other players and a central server each with a separate IP address or sourcing address or destination address. As the game proceeds, the game may be perceivably functional if one or two communication sessions drop, for example, but may become noticeably degraded if three drop. Therefore, the number of dropped or reinitiated sessions may be a relevant factor to be used to generate a desired QoS bar level indicator for the particular game application being used. Further, the game and the associated perceived quality may be more sensitive to the dropping of particular kinds of sessions, whereas other kinds of sessions used in the operation of the game may be less important.

The characteristics discussed above are non-limiting and merely exemplary and are provided to simplify the disclosure herein. The devices and methods herein may be used to provide QoS indications for any number, or types, of signal characteristics of interest. Characteristics of interest may be measured actively via electronic probes sent and returned, or passively by mere monitoring and sampling. A non-limiting example of an active probe is a basic "Ping". Measured characteristics may be processed before being presented. Such processing may include any number of logic rules and digital signal processing algorithms known in the art such as amplitude averaging, various transforms, various conversions, if-then-else rules, decision trees, table look-ups, time period integration and the like.

FIG. 1 is an abstract depiction of wireless network. The WCD 10 may be capable of long range communication with a telecommunications system 20. The telecommunications system 20 may be any telecommunications system including a mobile telecommunications system where the user may travel from base station-to-base station or hot spot-to-hot spot. The telecommunications system 20 may be an analog or digital cellular telecommunications system. Moreover, the telecommunications system 20 may be a Personal Communication Service (PCS) in either of its analog and digital versions. The telecommunication system 20 may utilize Time Division Multiple Access (TDMA), Code Division Multiple Access (CDMA), Frequency Division Multiple Access (FDMA) or Global System for Mobile (GSM) technologies. The telecommunication system 20 may be a satellite communication system and still fall under the purview of this disclosure. The telecommunication system 20 may also include the internet, an intranet, a WiFi or other network. The telecommunications system 20 may use any type and/or combination of spread spectrum techniques including CDMA spread spectrum, frequency hopping spread spectrum and pulse modulation spread spectrum.

Figure 2:
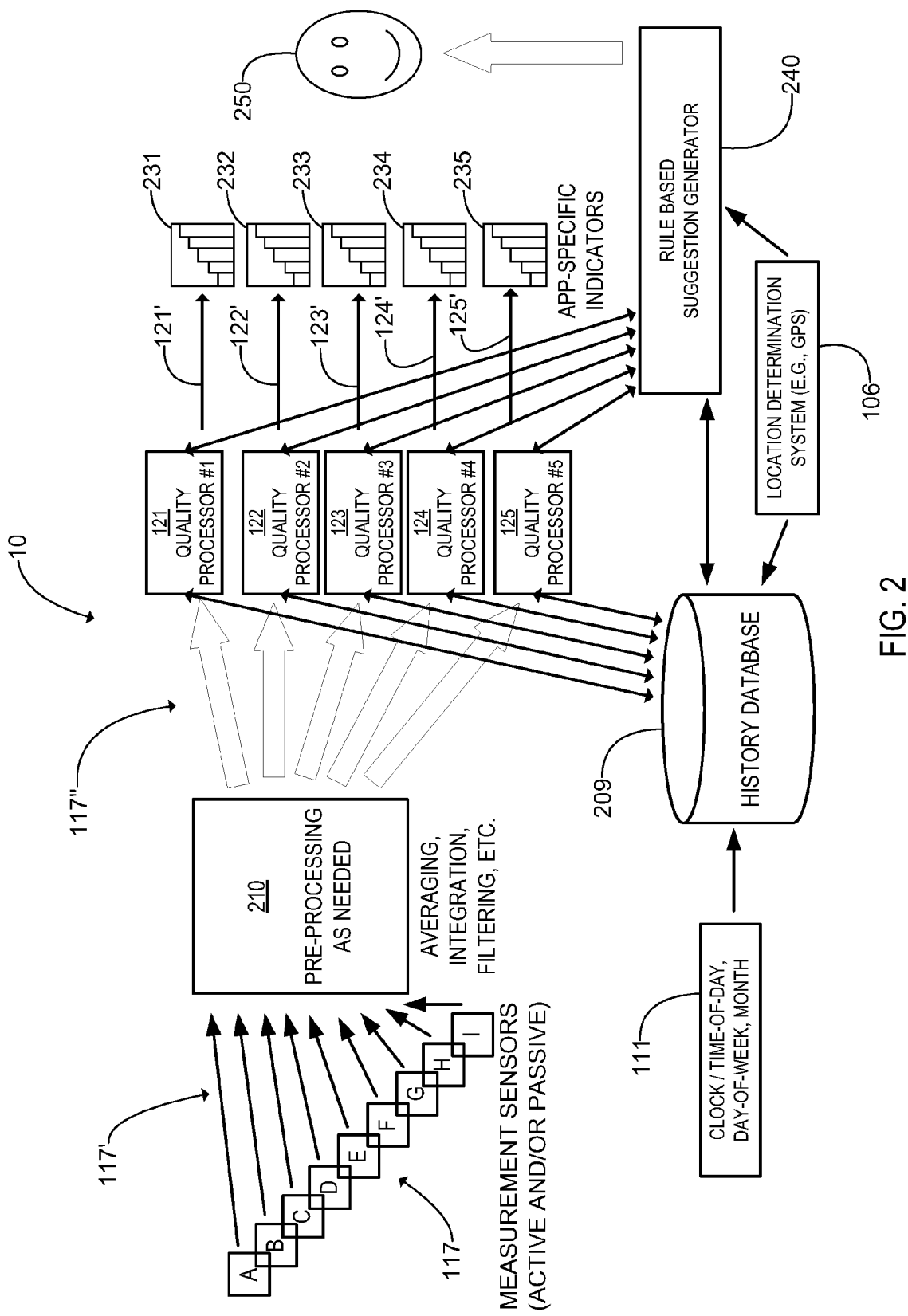
FIG. 2 is an abstract depiction of method and apparatus to create a characteristic indicator.

FIGS. 1 and 2 depict non-limiting examples of the WDC 10 and its components. The WCD 10 may include a plurality of software applications 100, a Radio Frequency ("RF") transceiver 102 and an associate antenna 101. The transceiver 102 may be capable of communicating wirelessly with the telecommunications system 20.

The WCD 10 may also include a screen 105 and a keypad 104. The screen 105 and the keypad 104 act as interfaces with the user of the WCD 10. Further, the WCD 10 may include a GPS receiver 106 from which to obtain the current geographical position of the WCD 10. Although the GPS 106 may calculate speed when operating under good conditions and strong satellite signals, intermittent reception can hinder GPS speed measurements. Therefore, it may be useful to include an additional input to determine a position or a parameter such as speed in order to better ensure a satisfactory level of accuracy when the GPS receiver 106 is impaired or ineffective for any reason. Such additional inputs may include cellular triangulation capability, Doppler measurement capability, and various ranging and ranging-based speed detection capabilities.

Geographic positions and any associated information may be saved to a database resident in a memory/database 109. The memory/database 109 may be comprised of any number or types of memory devices that conform to a manufacturer's requirements. Examples of memory devices include magnetic disks, flash memory, memory sticks, Random Access Memory, and Read Only Memory. The list of useful memory devices continues to grow over time and any specific examples mentioned herein are not intended to limit the particular device discussed. The memory/database 109 may contain other varied information and/or instructions such as a set of user preferences 110.

The WCD 10 may have a processor 119 to coordinate the function of its various components. The processor 119 performs actions based on instructions either hard coded into the processor 119 or stored in the memory/database 109. The processor 119 and/or the memory/database 109 are examples of computer readable media which store instructions that when performed implement various logical operations. Such computer readable media may include various storage media including electronic, magnetic, and optical storage. Computer readable media may also include communications media, such as wired and wireless connections used to transfer the instructions or send and receive other data messages.

The processor 119 may include a central processing unit, an embedded processor, a dedicated/specialized processor (e.g. digital signal processor) or a general purpose programmable processor or some combination. The processor 119 may be any other electronic element responsible for interpretation and execution of instructions, performance of calculations and/or execution of voice recognition protocols. Further, the processor 119 may communicate with, control and/or work in concert with other functional components, including at least the transceiver 102, the GPS receiver 106, measurement sensors 117, and the memory/database 109. Communications between and among the processor 119, the transceiver 102, the screen 105, the keypad 104, a user interface module 120, a clock 111, the GPS receiver 106 and other WCD 10 components may be facilitated through a bus 108. The bus 108 may be comprised of one or a plurality of busses as is desired by a manufacturer.

FIG. 2 is an exemplary embodiment of a functional diagram of additional portions of the WCD 10 that may be used to produce the characteristic indicators 231-235. According to embodiments described herein, the WCD 10 may include one or more measurement sensors 117A-117I, collectively referred to as the measurement sensors 117. FIG. 2 illustrates nine of the measurement sensors 117A-117I as a non-limiting example, however, a manufacturer may include as few or as many of the measurement sensors as required to satisfy a particular purpose. The measurement sensors 117A-117I may work independently or may work together as a suite of measurement sensors. The measurement sensors 117A-117I may be active sensors or passive sensors. In addition to signal characteristics, the measurement sensors 117A-117I may detect the compression technique by which the signal is being compressed by the signal source. Compression techniques may have different sensitivities to jitter and other signal parameters. The sensors 117A-117I may also work in conjunction with the central server 40 or other transmitting device to determine compression techniques or changes in compression techniques.

Measurement sensor outputs 117' from the measurement sensors 117A-117I may be preprocessed by any signal processing techniques known in the art in order to facilitate indicator processing. As non-limiting examples, preprocessing may include signal averaging, signal integration, signal differentiation, signal multiplexing, filtering, limiting, ratio detection, signal segregation and the like. Preprocessing may be accomplished by multiple pre-processors 210 operating either individually or in cooperation, if so desired. Preprocessing may be analog or digital or both. Preprocessing may additionally include any variety of logic rules and digital signal processing techniques as are known in the art.

Any of the un-preprocessed sensor measurements 117' or processed sensor measurements 117" may be communicated to one of more quality processors 121-125. In order to maintain diagram simplicity, the number of the quality processors 121-125 has been limited to five but in practice, the number of the quality processors may be any number as is required by a manufacturer to meet a specific requirement. It may be preferable to have one of the quality processors 121, 122, 123, 124, or 125 for each characteristic for which an application specific quality indicator, such as the indicator 231, 232, 233, 234, or 235, may be desired.

The quality processors 121-125 may receive processing inputs from a suggestion generator 240. The suggestion generator 240 may be a device, firmware or a software object. The suggestion generator 240 may provide processing rules and any characteristic thresholds/limits for such rules, and this may be done separately and differently for different applications as well as different indicators. The processing rules and thresholds may be weighted by the suggestion generator 240. Such weights may be sourced from a user 250 through the User Interface Module ("UIM") 120, from a source internal to the WCD 10 (i.e. the suggestion generator 240) or from an outside source such as the central server 40. As an example, such rules may direct that the level of audio jitter and video jitter be averaged together to produce an indicator value.

The quality processors 121-125 and/or the suggestion generator 240 may be able to look at, monitor, and/or examine any resident applications, such as the applications 100 of the WCD 10, to determine in what mode each of the applications are running in order to determine best and/or appropriate rules and threshold levels, or both, for the quality processors 121-125. For example, the quality processor 121 may determine that video application ABC is running in mode 1 from the suggestion generator 240 and that random jitter of the signal is 2.5 standard deviations from the mean from a preprocessor 210. As such the quality processor 121 may use logic rule set "A" containing a first set of weightings. If the application mode is still mode 1 but the random jitter level subsides to 1.0 standard deviations then a second set of weightings for logic rule set "A" may be substituted. Any number and combination of logic rules, parameters, parameter values, parameter weightings, thresholds, threshold values, application modes, and the like may be included with the quality processors 121-125 and/or the suggestion generator 240 as a manufacturer may find useful to meet a particular purpose. Other exemplary characteristics that may be of concern would include the rate of change in jitter/delay/latency/data loss/session re-initiations, and acceleration in the jitter/delay/latency/data loss/session re-initiations or any cyclicality or pattern by which jitter/delay/latency/data loss/session re-initiations changes over time.

To maintain the simplicity of the drawings, the number of the application specific indicators 231-235 has been limited to five. Any suggestion herein that there is a one-to-one relation between that number of the quality processors 121-125 and the number of the quality indicators 231-235 is merely the result of simplicity of presentation. According to embodiments herein, it is contemplated that the multiple application specific indicators 231-235 may be driven by a quality processor, such as the quality processor 121, and that a single application specific indicator, such as the indicator 231, may be driven by the multiple quality processors 121-125 as a manufacturer may deem necessary or expedient to meet a particular purpose.

The indicators 231-235 may be any type of indicators that are required by a manufacturer to satisfy a particular purpose. As non-limiting examples, the indicators 231-235 may be mechanical or electronic. As non-limiting examples, the indicators 231-235 may be comprised of one or more light emitting diodes ("LED"), lights, liquid crystal displays ("LCD"), other display technologies, or combinations thereof. The electronic indicators 231-235 may be shaped or configured in any desired fashion to accomplish a specific purpose. Such a configuration may be a progressive bar display, a red-yellow-green stop light configuration, rotating circles, progressive pie/sector displays and the like. Where the multiple indictors 231-235 are displayed simultaneously, the indicators may be displayed or superimposed together in a "dashboard" arrangement or dispersed about the user interface. The indicators 231-235 may have a corresponding label that may also be electronic to distinguish one indicator from another. The indicators 231-235 may be configured/shaped differently for each particular characteristic being rendered. The configuration/presentation may be manually altered by the user by manipulating one or more keys on the keypad 104 or other controls elsewhere on the WCD 10. In addition to visual indicators, the indicators 231-235 may be audio, vibratory, tactile, olfactory indicators or a combination thereof. Olfactory, vibratory, and/or tactile indicators may be useful in providing service to blind customers.

The indicators 231-235 may also be prioritized by logic within the WCD 10 or by the user 250 via the UIM 120. Such prioritization may also include a manual or an electronic priority override based on urgency. The indicators 231-235 may also be displayed sequentially either automatically or manually by manipulating a button on the WCD 10. Additionally, the indicators 231-235 may be programmed to pop-up as needed, such as when the user 250 has initiated a new application/service usage or when the quality of an in-use application/service changes dramatically, and then to disappear when appropriate.

Outputs 121'-125' from the quality processors 121-125 may be used to drive the indicators 231-235. The outputs 121'-125' may also be stored for subsequent use in the memory/database 109. The outputs 121'-125' may be used for any number of purposes. Such purposes may include trouble shooting within the WCD 10 or within the network 20. The outputs 121'-125' may also be used as one or more inputs to the preprocessor 210 or to the quality processors 121-125. Location information from the location system 106 may also be stored in the memory/database 109 for subsequent analysis as well.

Figure 3:
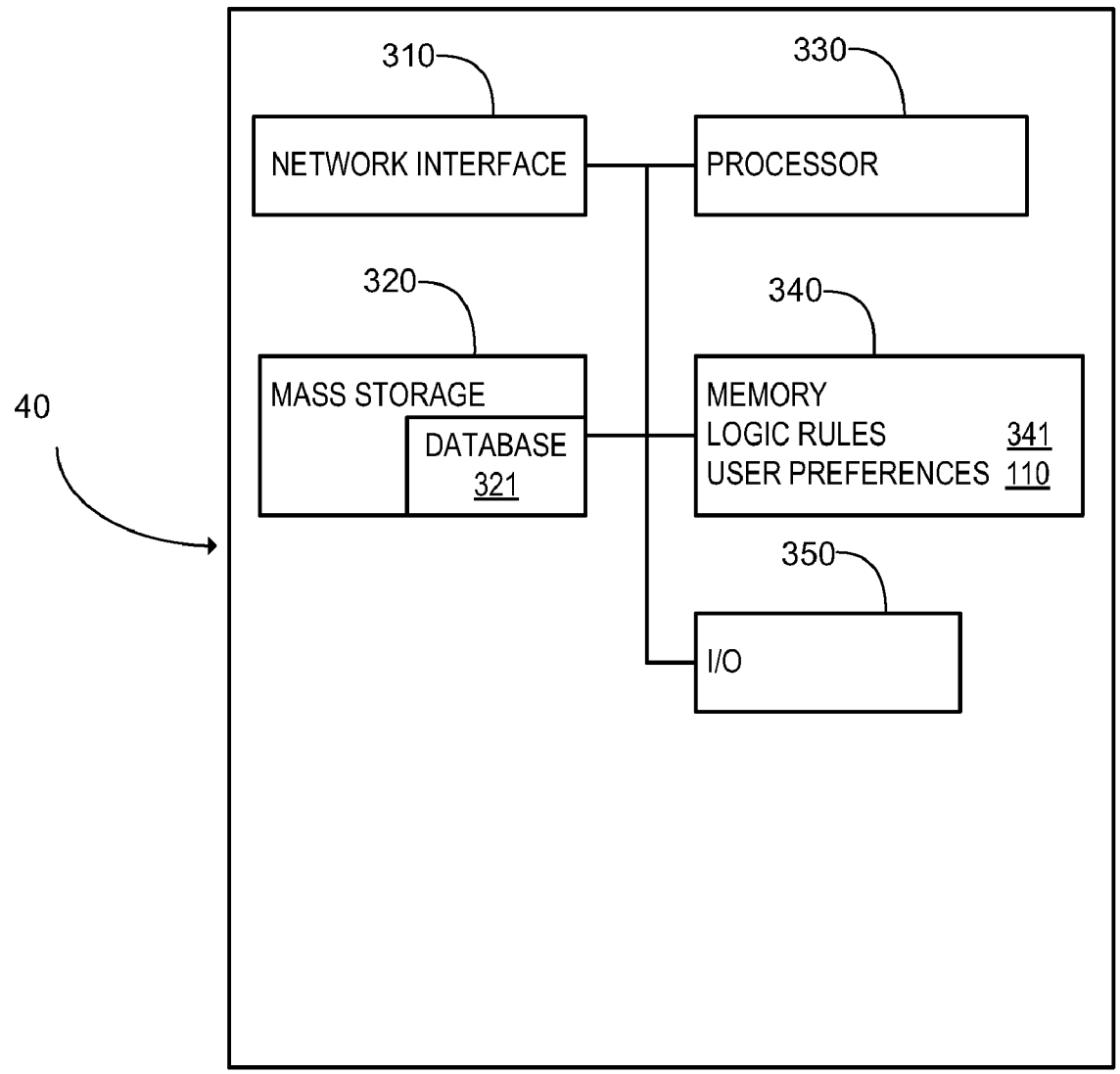
FIG. 3 is an abstract depiction of a central server within the network.

FIG. 3 provides an exemplary depiction of the central server 40. The central server 40 may store associated information on a plurality of geographic positions and software applications associated with the WCD 10. The central server 40 may sort the information and transmit the information to a requesting user, such as the user 250. The central server 40 may also be capable of determining the position of the WCD 10 by cellular triangulation, GPS or other means should a system design so require. Further, the central server 40 may provide signal information that when transmitted to the WCD 10 may assist in determine a signal characteristic. Such information may include packet or network performance information, such as network topology or changes therein. Such information may also include particular patterns of data and/or particular patterns of communications that are conducive to measurements of particular types. For example, known patterns of data and/or packets can facilitate effective measurement of data loss via comparison between known expected patterns and what is actually received. As another example, known patterns of communications can similarly facilitate jitter measurements, latency/delay measurements, and measurements of re-initiations. Note that communication patterns can include patterns of data packets, session formation, and session tear-down.

The central server 40 may include the standard components of a server computer including a processor 330, a memory 340, an input/output device 350, a mass storage 320, and a network interface 310. The processor 330 communicates with external devices including the requesting WCD 10 via the network interface 350. The processor 330 may be a single processor, multiple processors or multiple distribute processor and may be a dedicated/special purpose processor or a general purpose programmable processor or some combination. The processor 330 performs actions based on instructions either hard coded into the processor 330 or stored in the memory 340. The memory 340 may also store logic rules 341 and the user preferences 110 that may be used additional inputs to the quality processors 121-125 to influence or bias the processor outputs 121'-125'. The logic rules 341 and the user preferences 110 may be the same as those resident in the WCD 10 and serve the same purpose. The processor 330 executes several system functions including receiving associated information from reporting users, storing and collating the associated information, responding to query's for associated information and, if desired, crediting a reporting user's account as associated information is reported and requested.

The central server 40 may fulfill information requests from the WCD 10 that may be used as in input for the quality processors 121-125. For an example, as an alternative to determining or wholly determining the current location of the WCD 10 at the WCD, the WCD may request its current geographic position or some helpful data relevant to determination of its current geographical position from the central server 40. As a further example, the central server 40 may supply information to the WCD 10 concerning the network topology or changes therein. Such information may be useful in determining packet delay. Examples of the logical operations performed by the processor 330 are discussed below in relation to FIG. 5.

The memory 340 may be volatile, non-volatile or a combination thereof and may store instructions to be performed by the processor 330. The processor 330 and the memory 340 are examples of computer readable media. Other examples of computer readable media include optical disks, magnetic disks, flash memory, random access memory and read only memory.

The input/output device 350 may be used for local operation and management of the central server 40. The input/output device 350 may include a keyboard, mouse, display, and the like.

The mass storage device 320 may contain the application information, the logic rules 341, and/or applications such as an operating system, the location safety indicator service and an accounting system. Thus, the processor 330 may access the storage device 320 when implementing the location safety indicator service. The mass storage device 320 is another example of a computer readable medium.

The memory/database 109 of FIG. 1 may be contained in the WDC 10 or it may be contained within the mass storage device 320, or both. The memory/database 109 may be mirrored within a central database 321 that resides within the mass storage device 320 of the central server 40. As an alternative, the database 321 may be present as network storage, accessible via the network interface 350.

Figure 4:
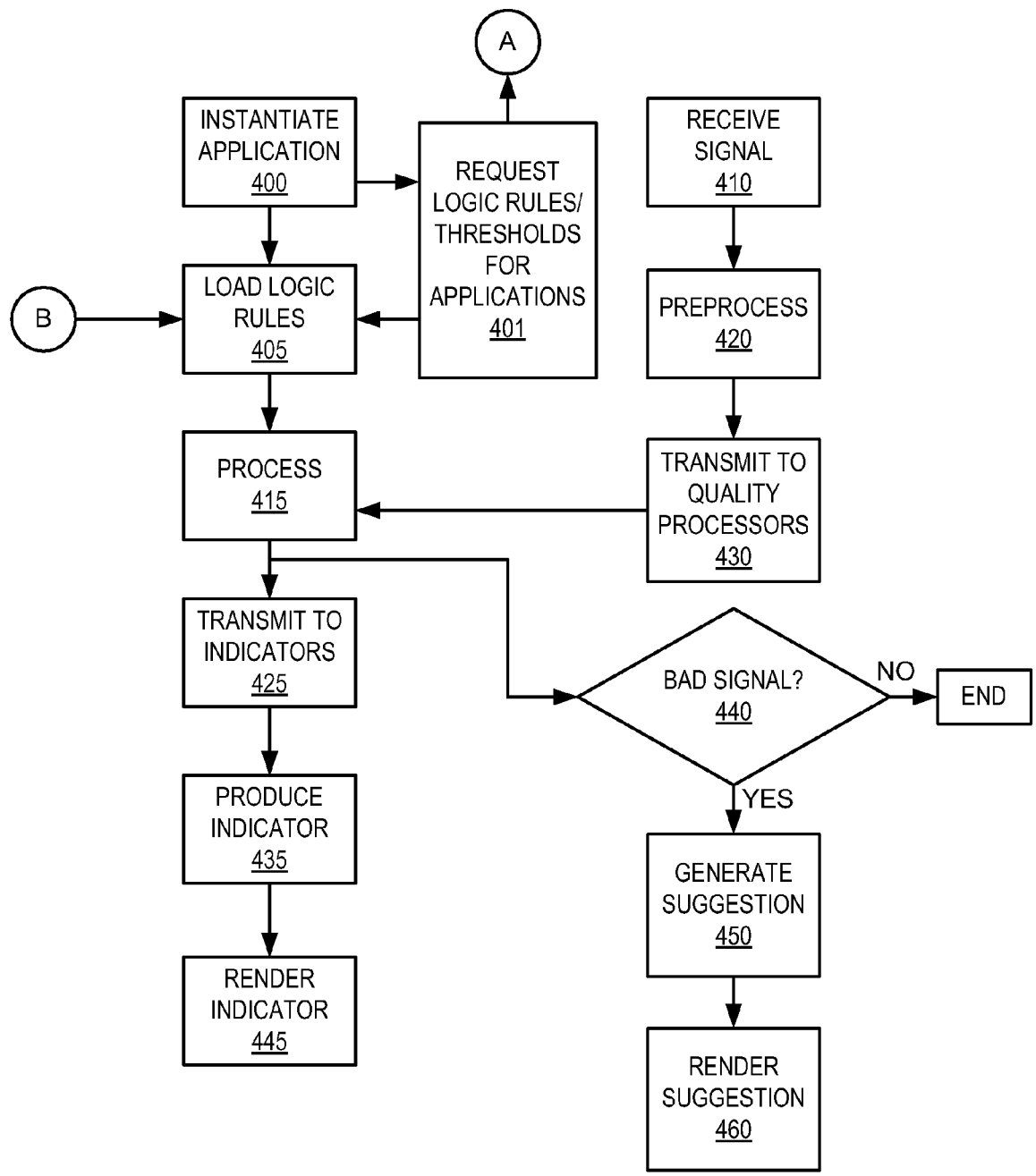
FIG. 4 is an exemplary flow chart demonstrating a method for creating a characteristic indicator.

FIG. 4 is a flow chart illustrating an example method for producing one or more signal characteristic indicators, such as the indicators 231-235, for the WCD 10. Being merely exemplary, it should be noted that the processes presented may be combined together, rearranged in their order and split into sub-process as would occur to one of ordinary skill in the art without departing from the scope of the disclosure presented herein.

The method begins at process 400 where an application, such as the application 100, is instantiated within the WCD 10. The application 100 may be any type of application compatible with the WCD 10 and with the WCD's associated protocol, such as WAP protocol. As non-limiting examples the applications 100 may be spreadsheets, word processors, e-mail, games of all sorts, IPTV, Voice, Voice-over-IP, radio, and television. Any type of application currently existing or to be created in the future is contemplated herein.

At process 401, the WCD 10 may send a query for any data, logic rules, thresholds, algorithms and other appropriate inputs required to accurately produce and render the application indicators 231-235 to a user, such as the user 250. Such information may be found in the memory/database 109. However, the WCD 10 may also query the central server 40 for any data, logic rules, thresholds, algorithms, network topology, network conditions such as the number of users in a cell (cell load), wireless environment conditions such as noise levels, and other appropriate inputs required to render the application indicator 231-235 to a user. Such information may not be available within the WCD 10, or the memory/database 109 may not be large enough to contain the required data. As another non-limiting example, the WCD 10 may not be equipped with the GPS receiver 106 and may require position data from the central server 40. Any requested data is subsequently transmitted to the WCD 10 in a reply communication.

At process 405, instantiation of the application 100 may cause the suggestion generator 240 to upload one or more of the logic rules 341 into the quality processors 121 125. The logic rules 341 may program/reprogram/reconfigure one or more of the quality processors 121-125 to analyze one or more of the preprocessor outputs 117" in a particular manner specifically related to the application 100 being instantiated. As a non-limiting example, if a multi-level game is instantiated, the suggestion generator 240 may upload the logic rules 341 to cause the quality processor 121 to create a session drop indicator and the quality processor 122 to create a Gaussian jitter indicator.

The logic rules 341 may be chosen based on the current geographic location received from the location determination system 106 of the WCD 10 or from a history database 209. The history database 240 base may store the outputs 121'-125' from each of the quality processors 121-125 as well as the time-of-day at which the outputs occurred. The history database 240 may also store the geographic location of the user 250 at the time the outputs 121'-125' occur. As a non-limiting example, the suggestion generator 240 may know by consulting the history database 209 and the location determination system 106 that the user 250 is in his office and that the signal in his office, for whatever reason, historically experiences random jitter distortions. Therefore, the suggestion generator 240 may upload instructions to the quality processor 121 to do a Gaussian jitter analysis. Conversely, when at home, the history database 209 may indicate that a periodic jitter appears in the signal. As such, the suggestion generator 240 may then instruct the quality processor 121 (or another of the quality processors 122-125) to do a periodic jitter analysis, in addition or instead of a Gaussian jitter analysis. The logic rules 341 may also be influenced by a time-of-day and/or day-of-week input from the clock/timer 111 associated with the WCD 10.

It is also contemplated to be within the scope of the disclosure herein that the output 121'-125' of the quality processors 121-125 may be stored into the history database 209 for future use or may also be used to influence/modify the logic rules 341 for current or future operation of the quality processors. Such a modification of the logic rules 341 many include a change in analysis, the addition and/or change of settings and may cause a change in the processors 121-125 themselves either as alternating between the physical processors 121-125 or by a reconfiguration of the processor should a processor be a programmable logic device such as an field programmable gate array.

At process 410 the signal is received at the WCD 10. The signal may be received at the antenna 101 and communicated to the preprocessor 210. As discussed above, the preprocessor 210 may conduct any pre-processing of the signal as may be known to one skilled in the art and suited to fulfill a particular product requirement at process 420. Such pre-processing may be done by one processor or multiple processors and may employ any number of signal sampling techniques as well as logic rules and signal processing techniques. Non-limiting examples of such techniques include averaging, integration, differentiation, filtering, limiting, ratio detection, various transforms, various conversions, if-then-else rules, decision trees, table look-ups, summation and the like. For example, the logic rules 341 may be used to modify signal processing, thus modifying or adapting signal processing methods conditionally based on aspects of the signals and/or based on other inputs. The received signals, or parts thereof may also be split, combined, compared, multiplexed or otherwise prepared to be used in the construction of one or more signal characteristics. It may also be the case where pre-processing is not necessary and that raw signal input is sufficient for further processing by the quality processors 121-125.

The preprocessor 210 may have one or more output signals, such as the outputs 117", each of which may be the input (directly or via other electronic components and/or pathways) to the one more of the quality processors 121-125 at process 430. When received by the quality processor(s) 121-125 the output signal(s) 117" are processed at process 415 to produce the application 100 specific signals 121'-125' which drive the application specific indicators 231-235. In process 430, the raw, measured or determined output signals 117" are provided to the bank of quality processors 121-125. Each of the quality processor 121-125 receives all of the pertinent inputs 117" which are available and processes the inputs 117" using a specific combination of algorithms, heuristics, techniques, thresholds and parameters as directed by the logic rules 341. Each of the quality processor 121-125 provides the outputs 121'-125' including one or more indications pertinent to the expected QoS of that application 100 under the current and/or expected conditions.

The outputs 121'-125' are transmitted to any of the indicators 231-235 as directed by the logic rules 341 in process 425. It is also possible that each of the quality processor 121-125 has associated with it a dedicated indicator, such as the indicator 231, 232, 233, 234, or 235, and its related circuitry required to actually render the indicator for viewing as is known in the art. At process 435 the output signals 121'-125' are processed for rendition as a visible, audible, vibratory, olfactory or tactile indication via the indicators 231-235 in process 445.

The indicators 231-235 may be associated with a specific application, such as the application 100, or may be associated with a type or class of applications that may have similar QoS concerns. The indicators 231-235 may be presented in any fashion that appeals to the taste of the user 250 or fulfills an operating requirement of the designer. The indicator 231-235 arrangement and presentation may be changed by the user 250 at any time by a click-and-drag process or other means as is known in the art such as a manipulating a user profile web page. The indicator 231-235 arrangement and presentation may also be changed by the service provider at any time via pushed software changes or other means as is known in the art. The indicators 231-235 may be presented to the user 250 individually, in any combination or may be presented in a round-robin fashion one at a time. As non-limiting examples, the indicators 231-235 may be manually and/or automatically stacked, arrayed in a "dashboard" presentation, superimposed, minimized, enlarged or manipulated in any fashion that is known in the art. Indicators may be combined with a background or other presentation graphic. The user 250 may be allowed to modify or customize the appearance of the indicators 231-235 if such capability is supported by the software and service provider.

The indicators 231-235 may be permanently displayed or may be invoked at any time by the user 250. Further, the indicators 231-235 may "pop-up" or alarm when a QoS characteristic becomes unsatisfactory or likely to be of interest for whatever reason. Such an alarm may be visual, vibratory, olfactory, tactile or audible. Such a pop-up may occur if the user 250 tries to instantiate a particular application, such as the application 100. The pop-up in effect communicates to the user 250 that the signal is or may be unsatisfactory for the application 100 that is running or that is being instantiated. A visual "pop-up" may be rendered on the screen 105. An audio alert may be rendered via a speaker 103. A tactile alert may be rendered via vibration as is well known in the art.

To effectuate the alerts and/or pop-ups, the quality processor outputs 121'-125' may be compared to minimum quality thresholds stored in the WCD memory 109 at process 440. If the outputs 121'-125' are below the minimum quality thresholds, the suggestion generator 240 may be prompted at process 450 to generate an electronic suggestion message or pop-up (visual, audio, vibratory, tactile, olfactory, or some combination) to the user 250 at process 460. If the outputs 121'-125' are above the minimum quality thresholds the electronic suggestion may be omitted. Suggestions may be generated by the Suggestion Generator 240 utilizing the history database 209 and the logic rules 341 to the user 250 as to how to improve the QoS. Such suggestions may be to move to a new or a specific (i.e. closest) location where the signal is historically known to be better for that application 100. Suggestions may be to use a different application whose signal requirements are more compatible with the current signal. Suggestions may be to wait for a different time where system conditions are better or for a time where, historically, signal quality is better. Suggestions may be to wait for a particular time and/or to move a particular distance even if it is not deterministically known that these will help, but only that they may help. Suggestions can be informed by whatever is known or predictable and to the degree that information is available or results can be predicted. Explanations or the reasons for the suggestions may be included and/or may be made available to the user 250 at the user's request, and the rationale may include the degree of certainty that a suggestion will be helpful.

Figure 5:
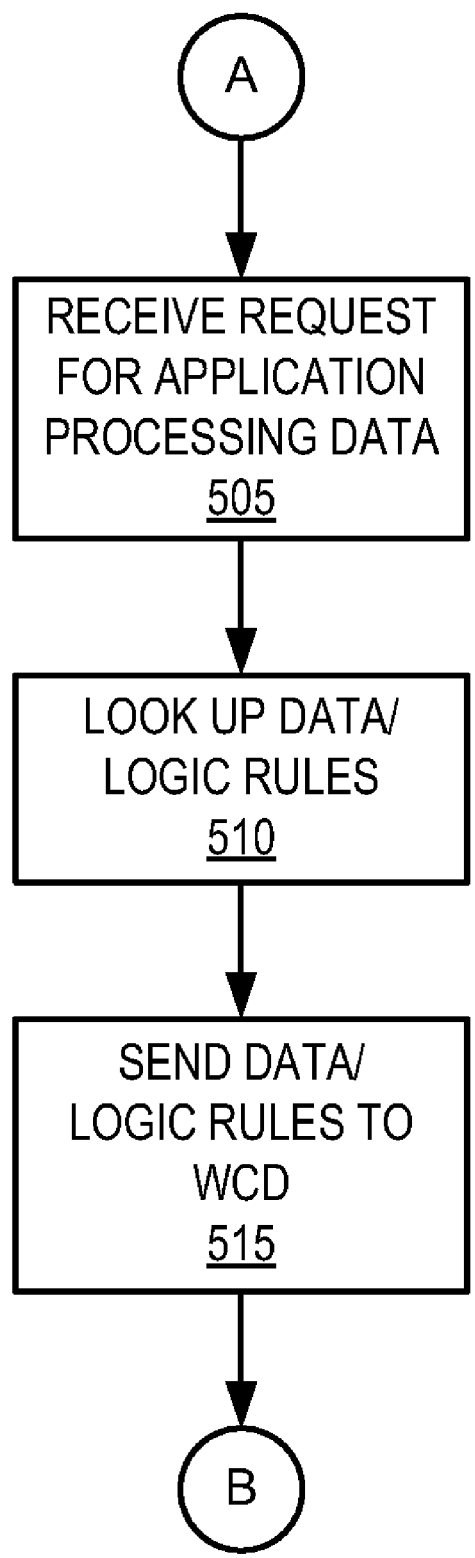
FIG. 5 is an exemplary flow chart demonstrating a method for retrieving information from a central server and creating a characteristic indicator.

FIG. 5, is a flow diagram depicting an exemplary operation of the central server 40. At process 505, a request for application processing data is received from the WCD 10. The requested data and or the logic rules 341 are located and retrieved by processor 330 at process 510 for retransmission back to the WCD 10 at process 515.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for conveying quality of service information at a geographic location to a user, comprising:

receiving a communication signal on a wireless communication device while located at the geographic location;

measuring a characteristic of the communication signal, in addition to signal strength, pertinent to proper operation of a particular wireless computing application on the wireless computing device;

determining a particular mode of operation of the particular wireless computing application operating on the wireless communication device;

electronically processing the characteristic based on a processing rule and a characteristic threshold pertinent to the particular mode of operation of the particular wireless computing application operating on the wireless communication device to determine quality of the characteristic;

providing a cognizable rendition of the quality of the characteristic to the user via the wireless communication device;

providing at least one suggestion to the user for improving the quality of service based on the quality of the characteristic; and providing, responsive to a user request, an explanation to the user for the suggestion for improving the quality of service.

2. The method of claim 1, wherein measuring a characteristic of the communication signal is an active measurement.

3. The method of claim 1, wherein the cognizable rendition is a visual indicator value.

4. The method of claim 1, wherein electronically processing the characteristic includes applying signal strength as a processing input.

5. The method of claim 1, wherein the visual indicator is a bar-level display.

6. The method of claim 1, wherein electronically processing the characteristic produces a relative indicator value.

7. The method of claim 6, wherein two or more relative indicator values are cognizably rendered simultaneously.

8. The method of claim 1, wherein the characteristic measured includes jitter.

9. A wireless communication device comprising:
a transceiver configured to receive a communication signal;
a measurement sensor in communication with the transceiver, the measurement sensor configured to measure a characteristic of the communication signal, other than signal strength, pertinent to proper operation of a particular wireless computing application operating on the wireless commutation device;
a memory storing instructions;
a processor in communication with the measurement sensor and the memory, wherein the instructions stored in the memory cause the processor to perform a method comprising producing an indicator value describing the characteristic; and
a suggestion generator in communication with the processor, the suggestion generator configured to provide a set of logic rules and characteristic thresholds to the processor,
wherein the method performed by the processor further comprises determining a particular mode of operation of the particular wireless computing application operating on the wireless communication device and electronically processing the characteristic based on a processing rule and a characteristic threshold, provided by the suggestion generator, pertinent to the particular mode of operation of the particular wireless computing application operating on the wireless communication device to determine a quality of the characteristic; and
wherein the suggestion generator is further configured to provide at least one suggestion to a user for improving quality of service based on the quality of the characteristic and provide, responsive to a user request, an explanation to the user for the suggestion for improving the quality of service.

10. The wireless communication device of claim 9 further comprising a location determination system, wherein the location determination system is configured to provide the current geographic location of the wireless communication device.

11. The wireless communication device of claim 9, further comprising a display configured to render an indicator specific to the wireless computing application to the user, the indicator being representative of the indicator value describing the characteristic.

12. The wireless communication device of claim 9 further comprising a database resident within a memory device, the database configured to store time stamped, historical signal characterstic values.

13. The wireless communication device of claim 12 wherein the suggestion generator is also in communication with the database, the suggestion generator using the time stamped, historical characteristic values to generate the logic rules.

14. The wireless communication device of claim 9 further comprising multiple measurement sensors, each measurement sensor configured to measure a different characteristic of the communication signal.

15. The wireless communication device of claim 9 further comprising multiple processors, wherein the memory stores instructions executable by each processor to cause each processor to process a different characteristic of the communication signal and produce a different indicator value.

16. The wireless communication device of claim 9, wherein the characteristic measured includes jitter.

17. A non-transitory computer-readable medium within a wireless communication device containing instructions to:
receive a communication signal on the wireless communication device, while located at a geographic location;
measure a characteristic of the communication signal pertinent to the proper operation of a particular wireless computing application operating on the wireless communication device, the characteristic being other than signal strength;
determine a particular mode of operation of the particular wireless computing application operating on the wireless communication device;
process the characteristic by a processor based on a processing rule and a characteristic threshold pertinent to a particular mode of operation of the particular wireless computing application operating on the wireless communication device to determine quality of the characteristic;
provide a cognizable rendition of the quality of the characteristic to a user via the wireless communication device via an indicator;
provide at least one suggestion to the user for improving quality of service based on the quality of the characteristic; and
provide, responsive to a user request, an explanation to the user for the suggestion for improving the quality of service.

18. The non-transitory computer readable medium within a wireless communication device of claim 17 containing instructions to store time-stamped, historical measured signal characteristic values within a database resident in a memory of the wireless communication device.

19. The non-transitory computer readable medium within a wireless communication device of claim 17, wherein the characteristic measured includes jitter.

* * * * *